(12) United States Patent
Ham et al.

(10) Patent No.: US 7,615,261 B2
(45) Date of Patent: Nov. 10, 2009

(54) METHOD OF FORMING ALIGNMENT LAYER IN LIQUID CRYSTAL DISPLAY DEVICE

(75) Inventors: YongSung Ham, Anyang-si (KR); MiKyung Chu, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 472 days.

(21) Appl. No.: 11/318,446

(22) Filed: Dec. 28, 2005

(65) Prior Publication Data
US 2006/0158594 A1 Jul. 20, 2006

(30) Foreign Application Priority Data
Dec. 30, 2004 (KR) .................. 10-2004-0117245

(51) Int. Cl.
*C09K 19/00* (2006.01)
*C09K 19/06* (2006.01)
*C09K 19/52* (2006.01)

(52) U.S. Cl. ................ 428/1.1; 428/1.2; 428/1.3; 430/20; 252/299.01

(58) Field of Classification Search ......... 428/1.1–1.3; 430/20, 270.1; 252/299.01
See application file for complete search history.

(56) References Cited

U.S. PATENT DOCUMENTS

| 5,796,458 | A | * | 8/1998 | Koike et al. ........... 349/126 |
| 5,850,273 | A | * | 12/1998 | Terashita et al. ........ 349/129 |
| 5,991,001 | A | | 11/1999 | Park |

FOREIGN PATENT DOCUMENTS

| CN | 1255527 | 6/2000 |
|----|---------|--------|
| CN | 1067161 | 6/2001 |
| CN | 1136473 | 1/2004 |
| JP | 02-040623 | 2/1990 |
| JP | 02-055330 | 2/1990 |
| JP | 06-148637 | 5/1994 |
| JP | 08-122792 | 5/1996 |
| JP | 10-197870 | 7/1998 |
| JP | 11-119222 | 4/1999 |
| JP | 11-305256 | 11/1999 |
| JP | 2003-4948 | 1/2003 |
| JP | 2004-226475 | 8/2004 |
| KR | 10-0286938 | 1/2001 |

\* cited by examiner

*Primary Examiner*—Geraldina Visconti
(74) *Attorney, Agent, or Firm*—McKenna Long & Aldridge

(57) ABSTRACT

An LCD with an improved image quality and a method of fabricating the same are provided. After a rubbing process as a primary alignment process is performed on an alignment layer, a pre-treatment is performed on the alignment layer before a light irradiation as a secondary alignment process. Thus, the light leakage at a stepped portion may be prevented and the contrast ratio can be improved. Consequently, a high quality image may be obtained and the reliability of products can also be enhanced. After a thermal treatment as the pre-treatment or during the thermal treatment, a light irradiation as a secondary alignment process is performed, or the light irradiation as the secondary alignment process is performed under an oxygen atmosphere, thereby enhancing the alignment process efficiency during the light irradiation. Further, a non-polarized light may be irradiated on the rubbed alignment layer during the light irradiation. Therefore, a high quality image may be obtained without any separate polarizers, thereby simplifying the manufacturing process and reducing the manufacturing cost.

24 Claims, 8 Drawing Sheets

THERMAL TREATMENT

LIGHT IRRADIATION

METHOD OF FORMING ALIGNMENT LAYER IN LIQUID CRYSTAL DISPLAY DEVICE

This application claims the benefit of Korean Patent Application No. 2004-117245, filed on Dec. 30, 2004, which is hereby incorporated by reference for all purposes as if fully set forth herein.

BACKGROUND OF THE INVENTION

1. Field of the Invention

The present invention relates to a liquid crystal display device, and more particularly, to a method of forming an alignment layer in an LCD capable of a high quality picture.

2. Discussion of the Related Art

In general, a cathode ray tube (CRT) has been most widely used among display devices for displaying image information on a screen until recently, but the CRT has many inconveniences due to large volume and heavy weight as compared to the display area.

With the development of various electronic devices, display devices are now being used in personal computers, notebook computers, wireless terminals, vehicle instrument panels, electronic display boards, and the like. Also, due to the development of high speed information communication technology, it is possible to transmit large amounts of image information, and the importance of a next generation display device capable of processing and displaying the large amounts of image information is increasing.

Such next generation display devices are required to realize lighter, thinner, shorter and smaller displays, high luminance, large-sized screen, low power consumption, and a low price. Among such next generation display devices, a liquid crystal display device (LCD) are gaining wide use.

The LCD exhibits a greater resolution than other flat displays, and a rapid response time comparable to that of the CRT to implement a moving picture.

One of the LCDs that are widely used at the present time, is a twisted nematic (TN) mode LCD. In the TN mode LCD, including electrodes on two substrates and liquid crystal directors twisted by 90°, a driving voltage is applied to the electrodes to drive the liquid crystal directors.

However, the TN mode LCD has a serious drawback of a narrow viewing angle.

Recently, LCDs employing new modes of operation are being actively researched so as to solve the problem of the narrow viewing angle. Examples of these new modes of operation include an in-plane switching (IPS) mode, an optically compensated birefringence (OCB) mode LCD, etc.

The IPS mode LCD generates a horizontal electric field so as to drive the liquid crystal molecules in a horizontal state with respect to the substrates by forming two electrodes on one substrate and applying a voltage between the two electrodes. In other words, the longer axis of the liquid crystal molecule does not stand up with respect to the substrates but rotates horizontally.

As a result, the IPS mode LCD has a small variation in the birefringence of liquid crystal according to a visual direction and thus has an excellent viewing angle characteristic compared to the TN mode LCD.

FIG. 1 is a flowchart illustrating a method of fabricating a related art LCD.

Referring to FIG. 1, first and second substrates having a plurality of patterns formed thereon are first manufactured in operation S100.

The first (or bottom) substrate includes a matrix-type array device including a thin film transistor (TFT), and the second (or top) substrate includes a color filter.

In operation S110, the substrates are cleaned to remove a foreign substance thereon. In operation S120, a polyimide material is printed on the substrate to form an alignment layer.

In operation S130, the alignment layer is dried and hardened using heat.

In operation S140, a surface of the hardened alignment layer is rubbed in one direction.

In operation S150, an adhesive seal pattern is formed at an edge of the second substrate except at a region where a liquid crystal injection hole remains and spacers are dispersed on the first substrate.

In operation S160, the first and second substrates are attached together with an accuracy of several μm so as to prevent light leakage.

In operation S170, the attached substrates are cut into unit cells. This cutting process includes a scribing process forming lines on the first and second substrates and a breaking process for dividing the scribed substrate into unit cells.

In operation S180, liquid crystal is injected through an injection hole into a gap between the first and second substrates cut into cells and the injection hole is sealed to complete the LCD.

A liquid crystal dispensing method can be used instead of the liquid crystal injecting method. In the liquid crystal dispensing method, after liquid crystal is first dispensed between the first and second substrates, the first and second substrates are attached together.

The physical characteristics of the liquid crystal are changed as the molecular arrangement varies, and thus the arrangement varies in response to an external force such as an electric field.

Due to the characteristics of the liquid crystal molecule, a control technique for arranging the state of the liquid crystal molecule is essential for operation of the LCD.

Specifically, a rubbing process to uniformly align liquid crystal molecules in one direction is essential for the normal operation of the LCD and a uniform display characteristic thereof.

A related art alignment layer forming process for determining an initial alignment direction of liquid crystal molecules will now be described in detail.

The forming of an alignment layer includes a process of depositing a high polymer thin layer and a process of aligning an alignment layer in one direction.

The alignment layer is typically made of a polyimide series organic material and is typically aligned through a rubbing process.

A polyimide series organic material may be deposited on a substrate and a solvent thereof is volatilized at about 60-80° C. Thereafter, the deposited material is hardened at about 80-200° C. to form an alignment layer. The alignment layer is rubbed in one direction with a roller wound with a rubbing cloth such as velvet to form an alignment direction thereon.

This rubbing process enables an easy and stable alignment process, and is thus suitable for mass production of the LCD.

However, a defect in the rubbing operation occurs when the rubbing cloth becomes defective during the rubbing operation.

Because the rubbing process is performed through direct contact between the rubbing cloth and the alignment layer, the rubbing process may cause the contamination of a liquid crystal cell due to particles, the damage of a TFT due to an electrostatic discharge, the necessity of an additional cleaning process after the rubbing process, and/or a non-uniform alignment of liquid crystal in a wide-screen LCD, leading to degradation in production yields of the LCD.

FIGS. 2A and 2B are respectively a sectional view and a plan view illustrating an alignment state of liquid crystal around a step portion of an electrode pattern such as a pixel electrode and a common electrode in a related art LCD.

Recently, an improved IPS mode LCD for improving the viewing angle and an IPS mode LCD manufactured using 3-4 masks so as to reduce the number of manufacturing processes has been developed and used. In these IPS mode LCDs, the step difference of the stepped edge portion is increased that causes an increase in the number of alignment defects.

Referring to FIGS. 2A and 2B, an alignment layer 151 is formed on a pixel electrode 130 patterned on a first substrate and the pixel electrode 130 has a step edge portion with a predetermined step difference.

A color filter layer 160 and an alignment layer 152 are formed on a second substrate facing the first substrate and a liquid crystal layer 190 is formed between the second and first substrates.

A common electrode, a TFT region, a gate line, and a data line also have a stepped edge portion The stepped edge portions of the electrode and line patterns in a pixel region cause a non-uniform alignment of liquid crystal in nearby regions.

If the liquid crystal is in a normally-black mode, a black color is displayed when no voltage is applied.

However, light leakage occurs in a region A shown in FIGS. 2A and 2B when no gate voltage is applied.

That is, when no voltage is applied, the liquid crystal must be aligned in the same direction as the rubbing direction of the alignment layers 151 and 152.

However, the stepped edge portion of the electrode causes a non-uniform liquid layer 191 having an alignment direction different than the rubbing direction and also causes the liquid crystal of a uniform liquid layer 192 to have an alignment direction different than the rubbing direction.

The non-uniform liquid crystal causes phase retardation of the light. The phase retardation causes a linearly-polarized light to change into an elliptically-polarized light. The elliptically-polarized light causes phase retardation in a uniform liquid crystal layer formed near the color filter layer 160, resulting in a large phase retardation.

Consequently, when no voltage is applied in a normally-black mode, light of the backlight assembly passes through the region A. This causes light leakage in a black display state and a decrease in a contrast ratio, thereby making it difficult to achieve a high image quality.

Recently, an improved IPS mode LCD for improving the viewing angle and an IPS mode LCD manufactured using 3-4 masks so as to reduce the number of manufacturing processes have been developed. In these IPS mode LCDs, the step difference of the stepped edge portion is increased to cause an increase in the alignment defect.

Accordingly, there remains a need for a device and method for preventing the LCD image degradation due to the stepped edge portion, such as increased black brightness and reduced contrast ratio.

SUMMARY OF THE INVENTION

Accordingly, the present invention is directed to an LCD and a method of fabricating the same that substantially obviate one or more problems due to limitations and disadvantages of the related art.

An advantage of the present invention is to provide a method of forming an alignment layer in an LCD that can enhance alignment process efficiency by performing a pre-treatment process before a light irradiation (a secondary alignment process) after a rubbing process (a primary alignment process).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of fabricating an LCD includes: coating an alignment layer on a substrate; rubbing the alignment layer; performing a thermal treatment on the substrate; and irradiating light onto the alignment layer.

In another aspect of the present invention, a method of fabricating an LCD includes: coating an alignment layer on a substrate; rubbing the alignment layer; providing an oxygen atmosphere around the substrate; and irradiating light onto the alignment layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

FIGS. 3A to 3E are sectional views illustrating a method of fabricating an IPS mode LCD according to an embodiment of the present invention.

Figure 1:
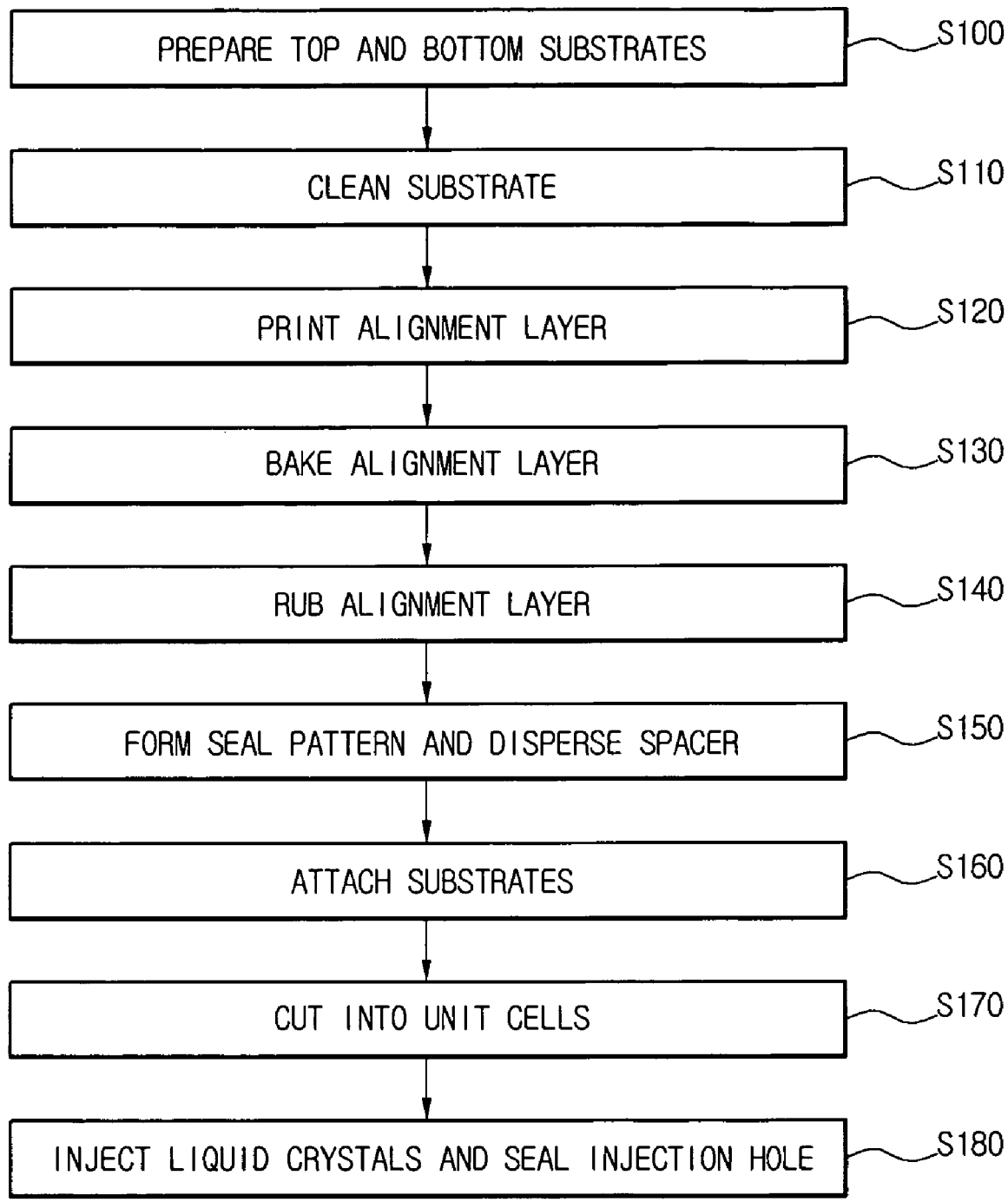
FIG. 1 is a flowchart illustrating a method of fabricating a related art LCD.
Figure 2A:
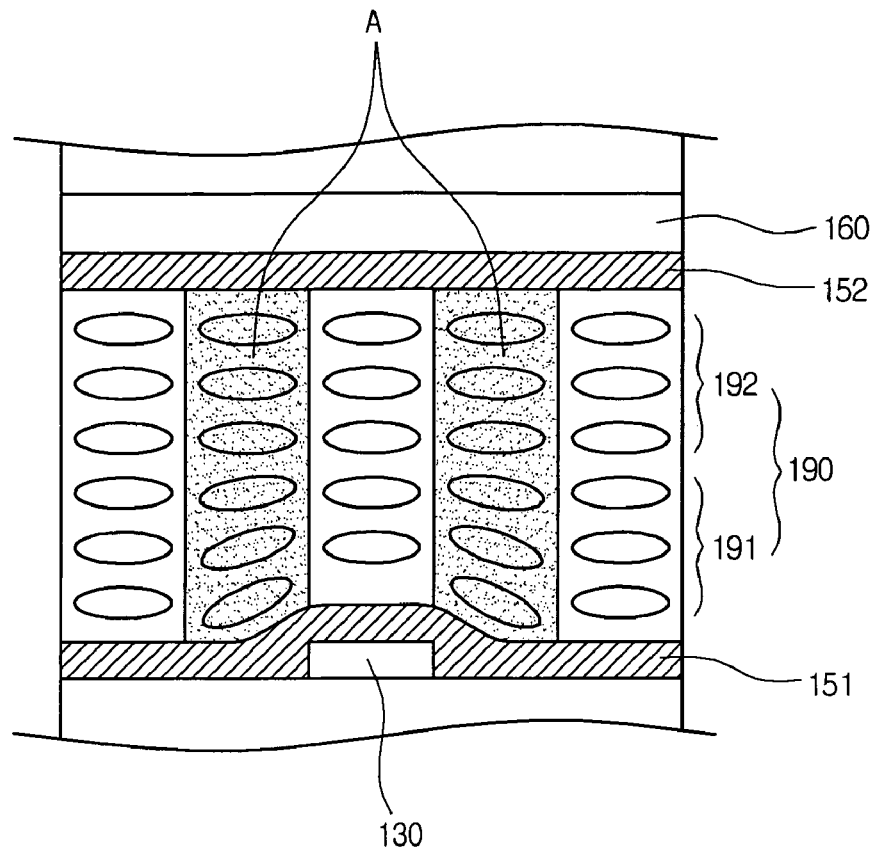
FIGS. 2A and 2B are a sectional view and a plan view of a liquid crystal alignment in a stepped portion of a related art IPS mode LCD.
Figure 2B:
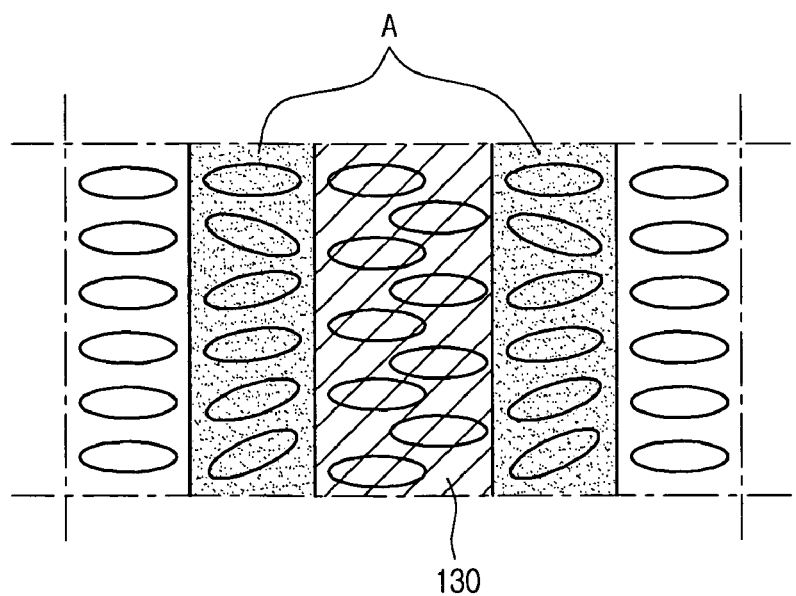
Figure 3A:
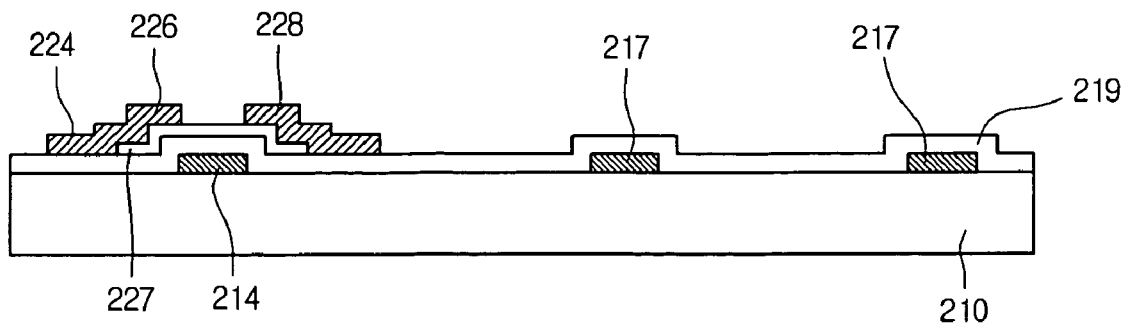
FIGS. 3A to 3G are sectional views illustrating a method of fabricating an IPS mode LCD according to an embodiment of the present invention.

Referring to FIG. 3A, a low-resistance metal having a low resistivity is deposited on a first substrate 210 so as to prevent signal retardation. The low-resistance metal layer is then patterned by photolithography to form a gate line (not shown) and a gate electrode 214 of a TFT that extends from the gate line.

The low-resistance metal may be copper (Cu), aluminum (Al), aluminum alloy (AlNd), molybdenum (Mo), chrome (Cr), titanium (Ti), tantalum (Ta), molybdenum tungsten (MoW), and so on.

In forming the gate line and the gate electrode 214, a common line (not shown) and a plurality of common electrodes 217 are formed at the same time. The common line is substantially parallel to the gate line and the plurality of common electrodes 217 extend from the common line.

Then, a gate insulating layer 219 may be formed by depositing inorganic insulating material (e.g., silicon nitride (SiNx) or silicon oxide (SiOx)) on an entire surface of the resultant structure with the gate line by a plasma enhanced chemical vapor deposition (PECVD) process or the like.

A material such as amorphous silicon is deposited on the gate insulating layer 219 and is selectively removed to form a semiconductor layer 227 on the gate insulating layer 219 in an island shape.

Although not shown, an ohmic contact layer may be further formed by implanting impurity ions into the amorphous silicon.

Figure 3B:
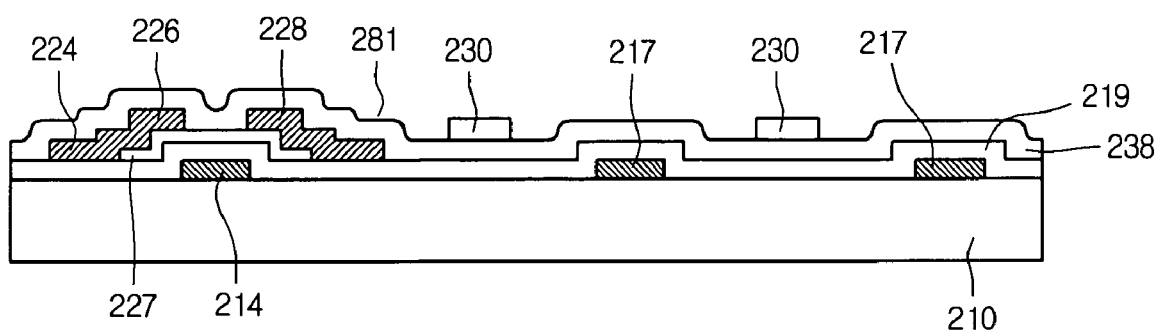

Referring to FIG. 3B, a metal, such as Cr, Al, Cu, Mo, Ti, Ta, MoW, and Al alloy, may be deposited on an entire surface above the gate insulating layer 219 and then is patterned to form a data line 224. The data line 224 crosses the gate line in a vertical direction and thus defines a pixel region. At the same time, a source electrode 226 and a drain electrode 228 are formed at both ends of the semiconductor layer 227.

A passivation layer 238 may be formed by coating a silicon nitride layer or an organic insulating layer, such as benzo-cyclo-butene (BCB), on an entire surface of the first substrate where the data line 224 is formed. Then, a contact hole (not shown) is formed in the drain electrode 228.

A transparent conductive layer is deposited on an entire surface using a transparent conductive material (e.g., indium tin oxide (ITO) or indium zinc oxide (IZO)) and then is patterned to form a plurality of pixel electrodes 230. The plurality of pixel electrodes 230 are connected to the drain electrode 228 and are disposed between the common electrodes 217 substantially parallel with the data line 224. Thus, the pixel electrodes 230 and the common electrodes 217 are alternately arranged.

Although not shown, when the pixel electrodes 230 are formed of a metallic material, the pixel electrodes 230 may be formed of the same material as the data line 224 and at the same time as the data line 224, before forming the passivation layer 238. Alternatively, the pixel electrodes 230 may be formed on a separate layer.

In addition, the common electrode 217 may be formed of the same material as the pixel electrodes 230 at the same time when forming the pixel electrodes 230.

Figure 3C:
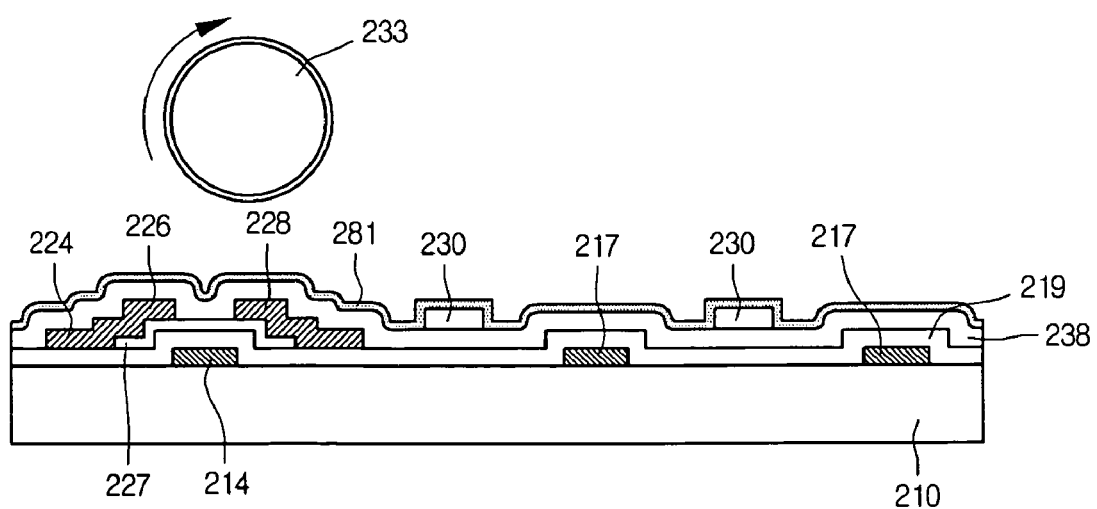

Referring to FIG. 3C, an alignment layer is formed on an entire surface of the substrate including the pixel electrodes 230. A first alignment layer 281 may be formed by printing a polyimide resin on the substrate and drying it. The polyimide resin has a good affinity with liquid crystal. Then, a primary alignment process is performed using a rubbing process.

In addition to polyimide resin, the material for the alignment layer may be polyamic acid, polyethleneimine, polyvinyl alcohol, polyamide, polyethylene, polystyrene, poly-phenylenephthalamide, polyester, polyurethane, and polymethylmethacrylate, that includes a polymer of which a bond is selectively broken in UV irradiation.

Figure 3D:
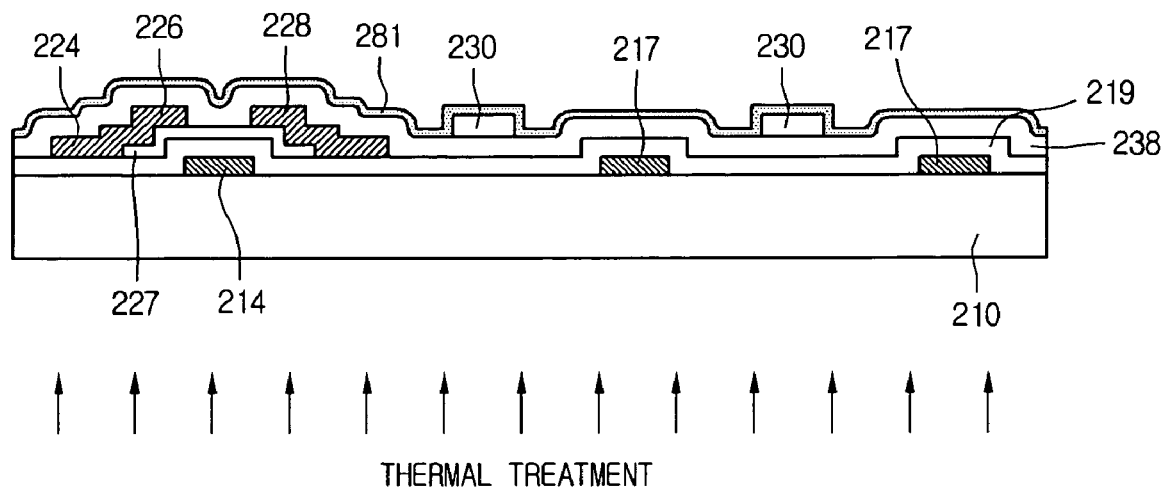

Referring to FIG. 3D, a thermal treatment is performed on the first alignment layer 281 that has undergone the primary alignment process.

The thermal treatment is a pre-treatment of a secondary alignment process that will be performed later. This thermal treatment may improve the efficiency of the secondary alignment process by forming a stable surface structure in the first alignment layer 281 in a state in which the alignment is disarrayed after the primary alignment process.

Assuming that the substrate 210 is at a constant temperature Tc, it is heated up to a temperature satisfying the expression Tr (a rubbing temperature)<Tc<Tg (a glass transition temperature of the alignment layer).

Such a thermal treatment may improve the reactivity of the alignment layer and the UV in the secondary alignment process, and the alignment process may be effectively performed at a low effective energy.

The thermal treatment may be performed before the secondary alignment process, and the secondary alignment process may be performed together with the thermal treatment.

The thermal treatment may be performed by passing hot air above the substrate as well as below the substrate.

Also, the thermal treatment may be performed while moving the substrate along an assembly line, may be performed in a chamber, or may be performed in a stopped state.

Figure 3E:
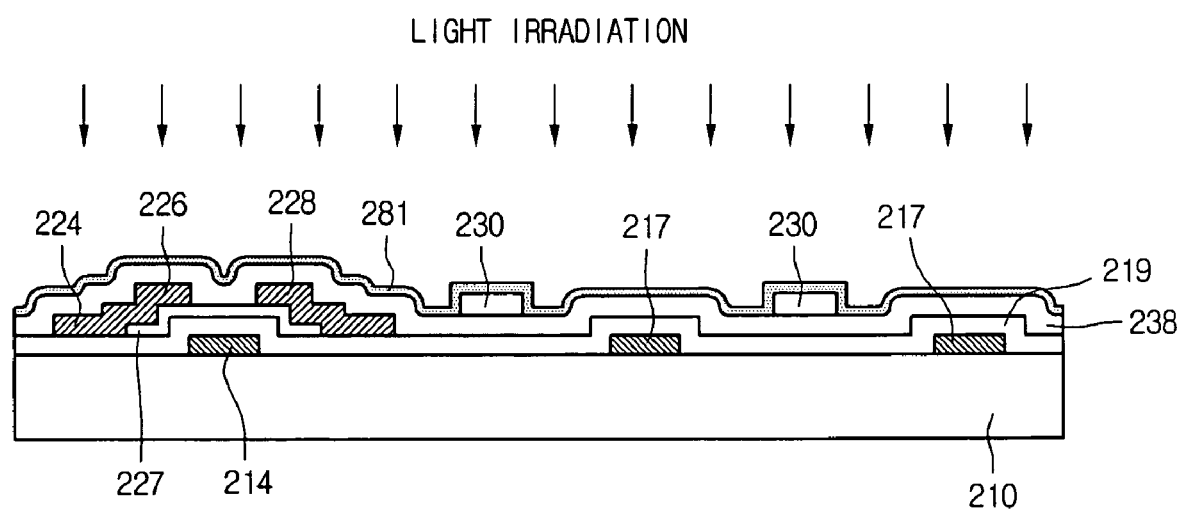

Referring to FIG. 3E, the secondary alignment process is performed by irradiating light onto the first alignment layer 281 that has undergone the pre-treatment.

The light may be a linearly polarized light, a partially polarized light, or a non-polarized light.

An oblique irradiation method or a vertical irradiation method may be used for the light irradiation.

For this purpose, a light irradiation apparatus is inclined with respect to the substrate and then irradiates light. Alternatively, light may be irradiated onto the substrate inclined at a predetermined angle.

One of the light irradiation apparatuses irradiates light onto an entire surface of the substrate, and another irradiates light while scanning the substrate.

The rubbing direction may coincide with the light alignment direction.

The rubbing direction may be symmetrical or asymmetrical with the light irradiation direction.

If the secondary alignment process is performed after the thermal treatment of the first alignment layer 281 that has undergone the primary alignment process, the alignment efficiency is maximized and thus the alignment is uniformly formed even at a stepped portion adjacent to the electrode part.

The stepped portion may be formed at the common electrode, the pixel electrode, the data line, the gate line, the common line, the TFT region, and so on.

Figure 3F:
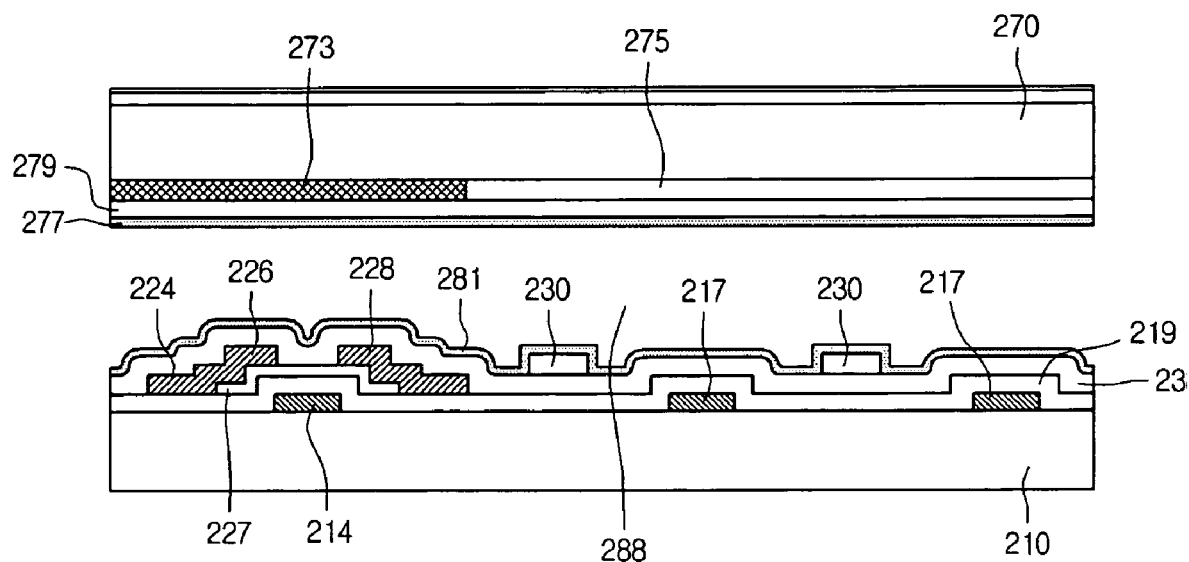

Referring to FIG. 3F, a black matrix 273 is formed using a black resin or a metal (e.g., Cr or CrOx) so as to prevent light leakage around the gate line, the data line, and the TFT region, where liquid crystals on the second substrate 270 cannot be controlled.

Then, R, G, and B color filters 275 for color reproduction may be formed in openings of the black matrix 273 by using an electrodeposition method, a pigment dispersion method, or a coating method. In order to protect the color filter layers 275, an overcoat layer 279 may be formed on an entire surface of the structure including the color filter layers.

Then, a second alignment layer 277 may be formed on the overcoat layer 279 by printing polyimide material having good affinity with liquid crystals and good photo-sensitive properties. The second alignment layer 277 is formed to have an alignment direction substantially parallel to the first alignment layer 281 by using the same rubbing process as the alignment process of the first alignment layer 281, the same pre-treatment as the thermal treatment, and the secondary alignment process as the light irradiation process.

Then, a column spacer (not shown) may be formed on the first substrate 210 or the second substrate 270. A seal pattern is formed at edges of the first substrate 210 or the second substrate 270, and then the first substrate 210 and the second substrate 270 are attached together in a vacuum state. Thereafter, a liquid crystal layer 288 is formed in a display region of the first substrate 210 or the color filters 270 by using a liquid crystal injection method.

According to another embodiment, after the seal pattern is formed at the edges of the first substrate 210 or the second substrate 270, the liquid crystal layer 288 is formed in the display region of the first substrate 210 or the second substrate 270 by using a liquid crystal dropping method, and then the first substrate 210 and the second substrate 270 are attached together.

Figure 3G:
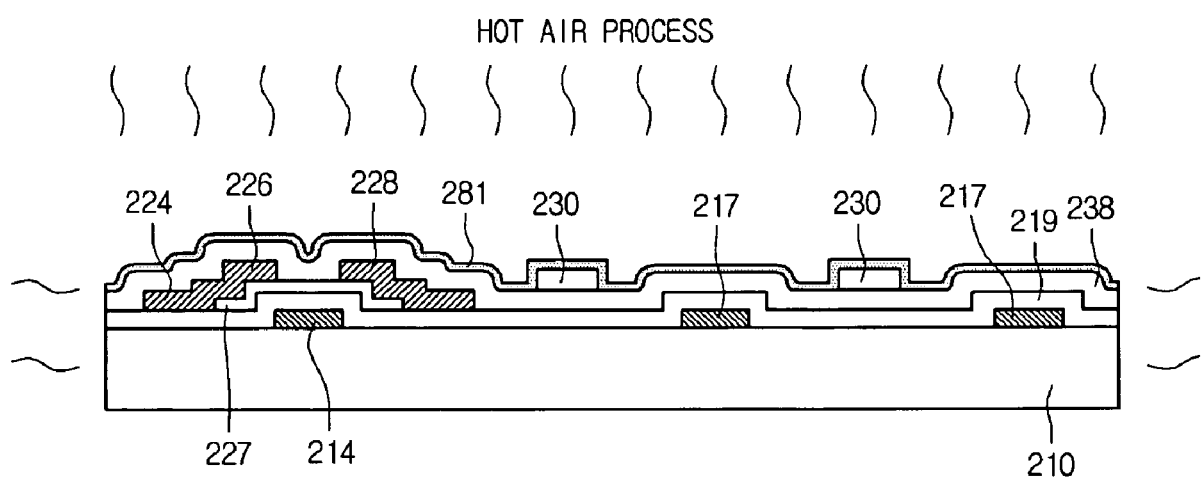

FIG. 3G is a sectional view illustrating a pre-treatment using a hot air according to an embodiment of the present invention.

A light irradiation that is the secondary alignment process is performed on the substrate that has undergone a pre-treatment using hot air. The hot air process can be performed together with the secondary alignment process at the same time.

Figure 4:
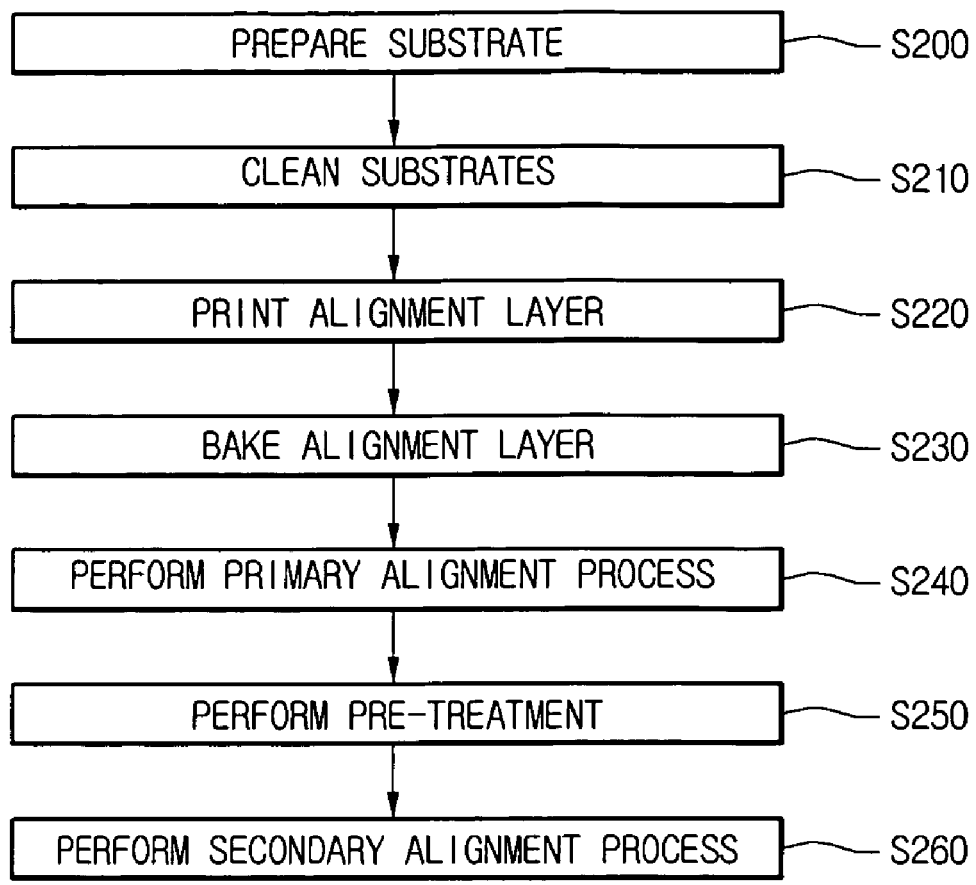
FIG. 4 is a flowchart illustrating a process of forming an alignment layer in an LCD according to the present invention.

FIG. 4 is a flowchart illustrating a method of forming an alignment layer of an LCD according to the present invention.

In operation S200, top and bottom substrates are prepared.

In operation S210, a cleaning process is performed to remove foreign particles from a substrate where patterns are formed. In operation S220, polyimide (PI) that is a raw material solution of an alignment layer may be printed on the substrate by using an apparatus for printing alignment layer.

In operation S230, a solvent may be dried and hardened by heating the raw material solution to a high temperature.

In operation S240, grooves are formed by rubbing a surface of the alignment layer in a predetermined direction using a rubbing apparatus, and then the primary alignment process is performed.

In operation S250, the pre-treatment such as the thermal treatment is performed on the alignment layer.

The thermal treatment is a pre-treatment of a secondary alignment process that will be performed later. This thermal treatment may improve the efficiency of the secondary alignment process by forming a stable surface structure in the first alignment layer 281 in a state in which the alignment is disarrayed after the primary alignment process.

Assuming that the substrate is at a constant temperature Tc, it is heated up to a temperature satisfying the expression Tr (a rubbing temperature)<Tc<Tg (a glass transition temperature of the alignment layer).

Such a thermal treatment may improve the reactivity of the alignment layer and the UV in the secondary alignment process, and the alignment process may be effectively performed at a low effective energy.

The thermal treatment may be performed before the secondary alignment process, and the secondary alignment process may be performed together with the thermal treatment.

In operation S260, a secondary alignment process is performed on the alignment layer by using a light irradiation method.

The light may be a linearly polarized light, a partially polarized light, or a non-polarized light.

Figure 5A:
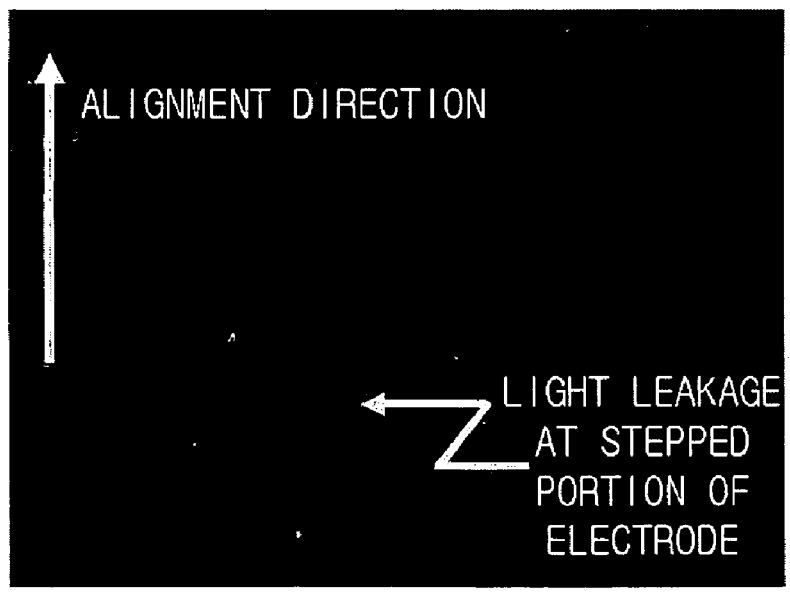
FIGS. 5A and 5B are photographs illustrating light leakage around an electrode in the IPS mode LCD according to the present invention.
Figure 5B:

FIGS. 5A and 5B are photographs illustrating the light leakage around an electrode in the IPS mode LCD according to the present invention.

As illustrated in FIG. 5A, the alignment layer on the substrate is formed by the primary alignment process. In the primary alignment process, the alignment layer formed of an alignment material (e.g., polyimide) is rubbed in one direction using a rubbing cloth (e.g., velvet, rayon or nylon), thereby forming the alignment direction.

If rubbing the periphery of the electrode part whose step difference is more than 0.1 µm, the alignment may not be obtained because the rubbing cloth does not come in contact with the alignment layer due to the stepped portion. Also, the alignment arrangement may not be uniform because the rubbing cloth is deformed while the rubbing cloth is passing the stepped portion, thus causing light leakage.

Accordingly, as illustrated in FIG. 5B, the pre-treatment, such as the thermal process, and the secondary alignment process using the light irradiation are performed on the alignment layer that has undergone the primary alignment process.

If the pre-treatment and the secondary alignment process such as the light irradiation are performed on the primarily-aligned alignment layer, the alignment in the stepped portion around the electrode part becomes uniform. Thus, light leakage almost does not occur.

The primary alignment process and the secondary alignment process may be performed at the same time.

The secondary alignment process uses light irradiation, and the light may be a linearly polarized light, a partially polarized light, or a non-polarized light.

An oblique irradiation method or a vertical irradiation method may be used for the light irradiation.

For this purpose, a light irradiation apparatus may be inclined with respect to the substrate and then irradiates light. Alternatively, light may be irradiated onto the substrate inclined at a predetermined angle.

One of the light irradiation apparatuses may irradiate light onto an entire surface of the substrate, and another can irradiates light while scanning the substrate.

The rubbing direction may coincide with the light alignment direction.

The rubbing direction may be symmetrical or asymmetrical with the light irradiation direction.

If the secondary alignment process is performed after the thermal treatment of the first alignment layer 281 that has undergone the primary alignment process, the alignment efficiency is maximized and thus the alignment is uniformly formed even at a stepped portion adjacent to the electrode part.

Also, the light may be irradiated onto the entire surface of the substrate or onto a portion of the substrate.

Figure 6:
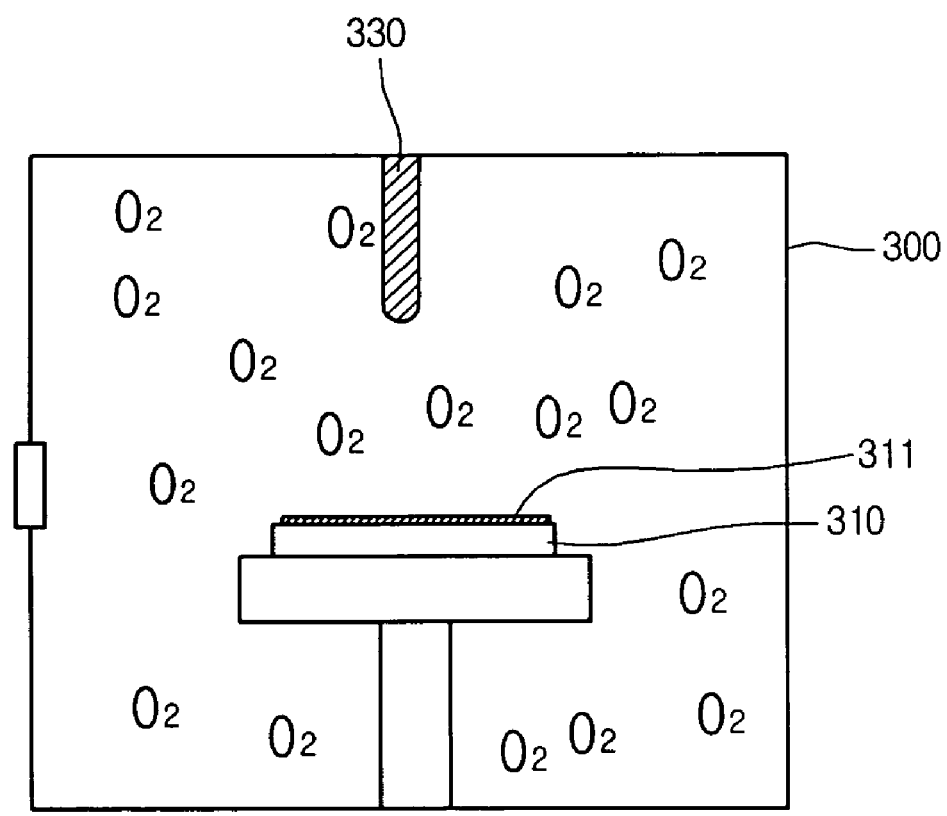
FIG. 6 is a sectional view of an apparatus for performing an alignment process according to another embodiment of the present invention.
Figure 7:
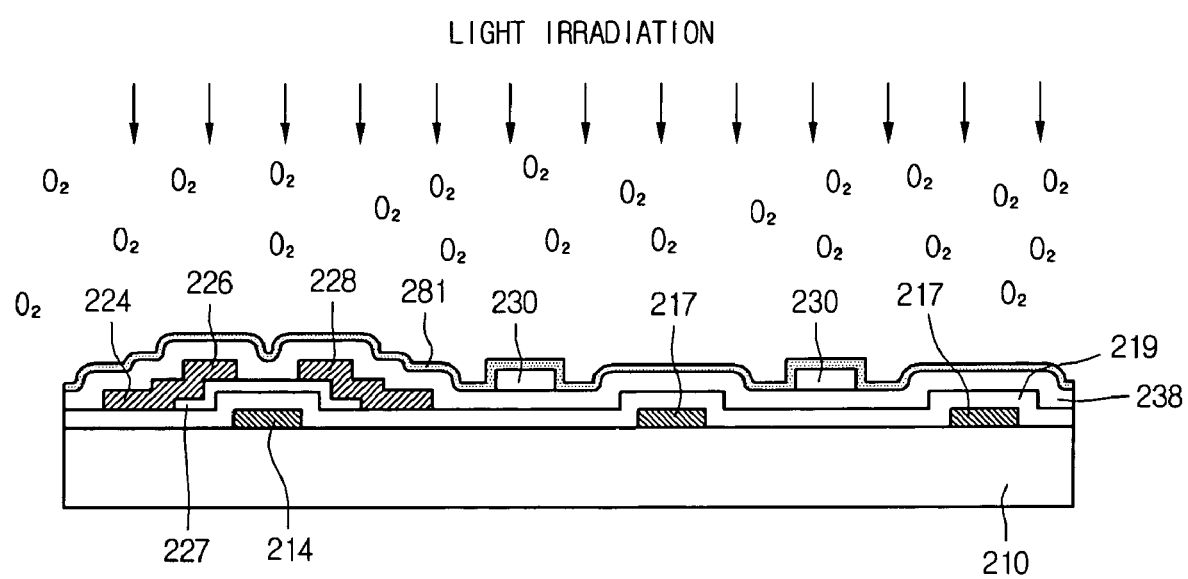
FIG. 7 is a sectional view of a substrate illustrating a pre-treatment and a secondary alignment process in FIG. 6.

FIG. 6 is a sectional view of an apparatus for performing an alignment process according to another embodiment of the present invention, and FIG. 7 is a sectional view of a substrate, illustrating a pre-treatment and a secondary alignment process in FIG. 6.

Here, FIG. 7 is a sectional view illustrating the secondary alignment process of the flowchart of FIG. 4 according to another embodiment of the present invention.

First, the secondary alignment process is performed by irradiating light onto the alignment layer 381 that has undergone the primary alignment process.

As illustrated in FIGS. 6 and 7, an oxygen (O₂) concentration within a chamber 300 with a light irradiation apparatus 330 is increased.

The increase of the oxygen concentration within the chamber 300 increases the amount of oxygen that reacts with the light and is converted into an active oxygen. Due to the increase of the active oxygen, the reactivity between the alignment layer 311 and the light is improved, thereby increasing the light irradiation efficiency.

During the light irradiation, the oxygen concentration in the chamber is more than 20%.

After the primary alignment process is performed on the entire surface of the alignment layer of the substrate 310 by using the rubbing method, the secondary alignment process is performed under the atmosphere of the increased oxygen concentration by the light irradiation. In this manner, the entire surface or the stepped portion of the substrate 310 is processed. Accordingly, the light leakage at the edges of the electrodes or the lines may be reduced, thereby improving the image quality.

The light may be linearly polarized light, partially polarized light, or non-polarized light.

For the light irradiation method, an oblique irradiation or a vertical irradiation with respect to the substrate 310 may be used.

One of the light irradiation apparatuses irradiates light onto an entire surface of the substrate 310, and another irradiates light while scanning the substrate 310.

The rubbing direction may be symmetrical or asymmetrical with the light irradiation direction.

Although it is preferable that the alignment direction resulting from the rubbing substantially coincides with that of the light irradiation, the rubbing direction and the light irradiation direction may or may not coincide with each other.

This depends on the properties of the alignment material. Some materials are aligned in a horizontal direction with respect to the light incident direction, and some materials are aligned in a vertical direction with respect the light incident direction.

As described above, after performing the rubbing process on the entire surface of the alignment layer in the LCD, the pre-treatment and the light irradiation are performed on the entire surface of the rubbed alignment layer or the stepped portion around the electrode. Accordingly, light leakage may be prevented and the contrast ratio may be improved. Also, a high quality image may be obtained, thereby enhancing the reliability of products.

In addition, the non-polarized light may be irradiated on the rubbed alignment layer during the light irradiation. Therefore, the high quality image may be obtained without any separate polarizers. Consequently, the manufacturing process may be simplified and the manufacturing cost may be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of fabricating an LCD (liquid crystal display device), comprising:
    coating an alignment layer on a substrate;
    rubbing the alignment layer;
    performing a thermal treatment on the substrate; and
    irradiating light onto the alignment layer,
    wherein the thermal treatment and the light irradiation are performed at the same time.

2. The method according to claim 1, wherein during the thermal treatment, the substrate is heated up to a temperature satisfying a relational expression of Tr<Tc<Tg,
    where Tr is a rubbing temperature, Tc is a temperature of the substrate, and Tg is a glass transition temperature of the alignment layer.

3. The method according to claim 1, wherein a thermal treatment is performed on the substrate when the light is irradiated onto the alignment layer.

4. The method according to claim 1, wherein the alignment layer is formed of one of polyimide, polyamic acid, polyethleneimine, polyvinyl alcohol, polyamide, polyethylene, polystyrene, poly-phenylenephthalamide, polyester, polyurethane, and poly-methylmethacrylate.

5. The method according to claim 1, wherein the light is one of linearly polarized light, partially polarized light, and non-polarized light.

6. The method according to claim 1, wherein a rubbing direction in the rubbing process is symmetrical to a light irradiation direction.

7. The method according to claim 1, wherein a rubbing direction in the rubbing process is asymmetrical to a light irradiation direction.

8. The method according to claim 1, wherein a rubbing direction in the rubbing process coincides with a light irradiation direction.

9. The method according to claim 1, wherein the light is irradiated obliquely with respect to the substrate.

10. The method according to claim 1, wherein the light is irradiated while scanning the substrate.

11. The method according to claim 1, wherein the substrate is inclined at a predetermined angle.

12. The method according to claim 1, further including, before the rubbing of the alignment layer, firing the alignment layer.

13. The method according to claim 1, wherein in the thermal treatment of the substrate, the substrate is processed using hot air.

14. A method of fabricating an LCD (liquid crystal display device), comprising:
    coating an alignment layer on a substrate;
    rubbing the alignment layer;
    providing an oxygen atmosphere around the substrate; and
    irradiating light onto an overall surface of the alignment layer,
    wherein the light irradiation converts oxygen into active oxygen and increases the amount of the active oxygen, and
    wherein the increases of the amount of the active oxygen are allowed to improve the reactivity between the alignment layer and the light.

15. The method according to claim 14, wherein a concentration of the oxygen is more than 20%.

16. The method according to claim 14, wherein the alignment layer is formed of one of polyimide, polyamic acid, polyethleneimine, polyvinyl alcohol, polyamide, polyethylene, polystylene, poly-phenylenephthalamide, polyester, polyurethane, and poly-methylmethacrylate.

17. The method according to claim 14, wherein the light is one of linearly polarized light, partially polarized light, non-polarized ultraviolet (UV) light.

18. The method according to claim 14, wherein a rubbing direction in the rubbing process is symmetrical to a light irradiation direction.

19. The method according to claim 14, wherein a rubbing direction in the rubbing process is asymmetrical to a light irradiation direction.

20. The method according to claim 14, wherein a rubbing direction in the rubbing process coincides with a light irradiation direction.

21. The method according to claim 14, wherein the light is irradiated obliquely with respect to the substrate.

22. The method according to claim 14, wherein the light is irradiated while scanning the substrate.

23. The method according to claim 14, wherein the substrate is inclined at a predetermined angle.

24. The method according to claim 14, further comprising, before the rubbing of the alignment, firing the alignment layer.

* * * * *